United States Patent
Nakamura et al.

(10) Patent No.: US 6,890,603 B2
(45) Date of Patent: May 10, 2005

(54) CASTING FILM FOR PRODUCING CERAMIC GREEN SHEET

(75) Inventors: Toru Nakamura, Saitama (JP); Tomishi Shibano, Saitama (JP)

(73) Assignee: LINTEC Corporation, Tokyo (JP)

(*) Notice: Subject to any disclaimer, the term of this patent is extended or adjusted under 35 U.S.C. 154(b) by 353 days.

(21) Appl. No.: 10/278,873

(22) Filed: Oct. 24, 2002

(65) Prior Publication Data

US 2003/0059629 A1 Mar. 27, 2003

Related U.S. Application Data

(63) Continuation of application No. 09/873,254, filed on Jun. 5, 2001, now abandoned.

(30) Foreign Application Priority Data

Jun. 28, 2000 (JP) ........................................ 2000-195196

(51) Int. Cl.⁷ ............................. B05D 1/36; B05D 1/38; B05D 3/02; B32B 31/00
(52) U.S. Cl. .................... 427/415; 427/387; 427/397.7; 428/352; 428/446; 428/447; 428/448; 428/523
(58) Field of Search ................................ 428/343, 352, 428/446, 447, 448, 523; 427/372.2, 387, 397.7, 415

(56) References Cited

U.S. PATENT DOCUMENTS 4,533,600 A * 8/1985 Coughlan et al. ........... 428/414
5,393,604 A * 2/1995 Sanchez ..................... 428/325
6,410,157 B1   6/2002 Nakamura et al.

OTHER PUBLICATIONS

U.S. patent application Ser. No. 09/883,257, filed Jun. 19, 2001, granted.
U.S. patent application Ser. No. 09/897,131, filed Jul. 3, 2001, pending.
U.S. patent application Ser. No. 09/926,130, filed Sep. 7, 2001, pending.
U.S. patent application Ser. No. 09/926,222, filed Sep. 26, 2001, pending.
U.S. patent application Ser. No. 09/873,254, filed Jun. 5, 2001, pending.

* cited by examiner

Primary Examiner—Michael J. Feely
(74) Attorney, Agent, or Firm—Oblon, Spivak, McClelland, Maier & Neustadt, P.C.

(57) ABSTRACT

There is disclosed a casting film which is used for producing a ceramic green sheet and which comprises a substrate film (e.g. polyethylene terephthalate film) and a releasing layer formed thereon comprising a mixture of a silicone based releasing agent (e.g. addition reaction type silicone based releasing agent) and a cellulose derivative (e.g. ethyl cellulose, methyl cellulose, hydroxyethyl cellulose, carboxymethyl cellulose or hydroxypropyl cellulose). The casting film has excellent wettability of ceramic slurry and moderate releasability for the ceramic green sheet, and prevents the occurrence of repelling even in the case of the ceramic slurry being coated in a small thickness, and also the occurrence of lifting or peeling off of the green sheets even in the case of the ceramic slurry being repeatedly coated.

8 Claims, No Drawings

CASTING FILM FOR PRODUCING CERAMIC GREEN SHEET

This application is a continuation of application Ser. No. 09/873,254, filed on Jun. 5, 2001, now abandoned.

BACKGROUND OF THE INVENTION

1. Field of the Invention

The present invention relates to a casting film for producing a ceramic green sheet. More particularly, it is concerned with a casting film which is used in the production process of a ceramic green sheet in producing ceramic electronic part items, and which has excellent wettability of ceramic slurry and moderate releasability for the ceramic green sheet.

2. Description of the Related Arts

A ceramic electronic part item such as a capacitor, a laminated inductor element, a piezo-part, a thermistor and a varister is produced by a method comprising the steps of forming a green sheet by coating a casting film with ceramic slurry which is suited to the aforesaid electronic part items, which is used in high dielectric constant, magnetism and the like, and which is composed of ceramic powders, organic binders, plasticizers, solvents (an organic solvent or water) and the like (Step ①); equipping the resultant green sheet with an electrode made of palladium, silver, nickel or the like by means of screen printing (Step ②); thereafter peeling off the green sheet from the casting film and laminating the green sheets in multi-layer (Step ③); forming ceramic green chips through a step of press cutting (Step ④); baking the chips thus obtained (Step ⑤); and equipping the baked chips with terminal electrodes made of silver, silver palladium, nickel, copper or the like (Step ⑥). In addition thereto, there has recently been proposed a new production process in which the above-mentioned Steps ① and ② are repeated plural times, followed by the Step ③ {refer to Japanese Patent Application Laid-Open No. 130150/1996(Heisei-8)}.

Accompanying miniaturization, weight-saving and improved performance of ceramic electronic parts in recent years, a thin-filmed green sheet is in rapid progress, and is required to have a film thickness of 4 $\mu$m or smaller. Conventional casting films wherein a silicone based releasing agent is used, however, give rise to a problem in that repelling is caused due to small thickness of coating in the case of applying ceramic slurry, thereby making it impossible to form a uniform coating. Hence, it is urged to develop a casting film imparted with favorable wettability of ceramic slurry. In addition, with regard to the above-mentioned multi-layering method by repeating the Steps ① and ② plural times, conventional casting films involve such a problem that excessive releasability thereof causes the green sheet firstly formed to be lifted or peel off from the casting film at the time of repeated coating of ceramic slurry on and after the second time, resulting in unfavorable practice of the multi-layer casting. Therefore, it is urged to develop a casting film imparted with moderate releasability from a green sheet.

SUMMARY OF THE INVENTION

In such circumstances, an object of the present invention is to provide a casting film which is used in the production of a ceramic green sheet to be employed in a ceramic electronic part items, and which is free from repelling on ceramic slurry coating and also free from lifting and/or peeling off on repeated coating of ceramic slurry.

Other objects of the present invention will be obvious from the text of this specification hereinafter disclosed.

As a result of intensive extensive research and investigation accumulated by the present inventors in order to develop a casting film which is used for producing a ceramic green sheet and which is imparted with the foregoing requisite performances, it has been found that a casting film which is adapted to the objects of the invention is obtainable by using a mixture of a silicone based releasing agent and a cellulose derivative as a releasing agent constituting a releasing layer. The present invention has been accomplished on the basis of the above-mentioned findings and information.

That is to say, the present invention provides:

(1) a casting film which is used for producing a ceramic green sheet and which comprises a substrate film and a releasing layer formed on at least either side thereof, wherein said releasing layer comprises a mixture of a silicone based releasing agent and a cellulose derivative;
(2) the casting film for producing a ceramic green sheet as set forth in the preceding item (1), wherein the silicone based releasing agent is an addition reaction type silicone based releasing agent;
(3) the casting film for producing a ceramic green sheet as set forth in the preceding item (1), wherein the cellulose derivative is at least one member selected from the group consisting of ethyl cellulose, methyl cellulose, hydroxyethyl cellulose, carboxymethyl cellulose and hydroxypropyl cellulose;
(4) the casting film for producing a ceramic green sheet as set forth in the preceding item (1), wherein the ratio of solid content by weight of the silicone based releasing agent to the cellulose derivative (silicone based releasing agent: cellulose derivative) is in the range of 90:10 to 3:97; and
(5) the casting film for producing a ceramic green sheet as set forth in the preceding item (1), wherein the substrate film comprises polyethylene terephthalate.

DESCRIPTION OF PREFERRED EMBODIMENT

The silicone based releasing agent to be used as an either component of the releasing agent in the present invention, which is a conventional well known addition reaction type silicone based releasing agent, comprises an addition reaction type silicone resin as the principal component, a crosslinking agent and a catalyst, both being incorporated in the silicone resin, and may be incorporated as desired, with an addition reaction inhibitor, a release modifier and an adhesion improver. It may further be incorporated with a photosensitizer in the case of carrying out ultraviolet ray irradiation in addition to a heat treatment in a curing step after coating a releasing agent.

The type of the silicone based releasing agent may be any of a solvent type, an emulsion type and a solventless (solvent free) type provided that the silicone resin is of an addition reaction type. Of these, a solvent type releasing agent is suitable from the aspect of quality and easiness of handling.

The above-mentioned addition reaction type silicone resin is not specifically limited, but may be selected for use for instance, from those that have heretofore been customarily used as a releasing agent composed of a heat curable addition reaction type silicone resin, which is exemplified by at least one member selected from polyorganosiloxanes having an alkenyl group as a functional group in a molecule. Preferable examples of the above-mentioned polyorganosiloxanes having an alkenyl group as a functional group in a molecule include polydimethyl-siloxane having a vinyl group as a functional group, polydimethylsiloxane having a hexenyl group as a functional group and the mixture of the two.

The crosslinking agent is exemplified by polyorganosiloxane having in its one molecule, at least two hydrogen atoms each bonded to a silicon atom, specifically by dimethylsiloxane/methylhydrogen-siloxane copolymer the end of which is hindered with dimethylhydrogen-siloxy group, dimethylsiloxane/methyl-hydrogen-siloxane copolymer the end of which is hindered with trimethylsiloxy group, poly(methylhydrogen-siloxane) the end of which is hindered with trimethylsiloxy group and poly(hydrogen silsequioxane). The amount of the exemplified crosslinking agent to be used is selected in the range of 0.1 to 100 parts by weight, preferably 0.3 to 50 parts by weight based on 100 parts by weight of the addition reaction type silicone resin.

There is usually employed as a catalyst, a platinum base catalyst, palladium base catalyst and rhodium base catalyst each in a proper amount to accelerate polymerization reaction.

Examples of the release modifier include dimethylpolysiloxane and silicone resin.

The aforesaid addition reaction inhibitor is a component used for the purpose of imparting shelf life stability at room temperature to the silicone resin, and is specifically exemplified by 3,5-dimethyl-1-hexyne-3-ol, 3-methyl-1-pentene-3-ol, 3-methyl-3-pentene-1-in, 3,5-dimethyl-3-hexene-1-in, cyclic tetravinylsiloxane and benzotriazole.

The aforesaid photosensitizer is not specifically limited, but may be properly optionally selected for use from those that have heretofore been customarily used in ultraviolet curable resin. Examples thereof include benzoins, benzophenones, acetophenones, α-hydroxy ketones, α-amino ketones, α-diketones, α-diketone dialkyl acetals, anthraquinones, thioxanthones and the other compounds.

Any of the above-exemplified photosensitizers may be used alone or in combination with at least one other. The amount thereof to be used is selected in the range of usually 0.01 to 30 parts by weight, preferably 0.05 to 20 parts by weight based on 100 parts by weight of total amount of the addition reaction type silicone resin and the crosslinking agent.

As the cellulose derivative to be used as an other component of the releasing agent in the present invention, it is suitable to employ at least one member selected from the group consisting of ethyl cellulose, methyl cellulose, hydroxyethyl cellulose, carboxymethyl cellulose and hydroxypropyl cellulose.

Since the dissolvability of the cellulose derivative in an organic solvent or water is different from one another depending upon the type thereof, it is preferable to select a cellulose derivative which is more prone to be dissolved in an organic solvent such as toluene and ethyl acetate for a solvent type silicone based releasing agent, and to select a cellulose derivative which is more prone to be dissolved in water for an emulsion type silicone based releasing agent. For instance, it is preferable in the case of a solvent type silicone based releasing agent to combine ethyl cellulose, methyl cellulose or hydroxyethyl cellulose and in the case of an emulsion type silicone based releasing agent to combine carboxy cellulose, hydroxyethyl cellulose or hydroxypropyl cellulose.

In order to improve the compatibility with the silicone based releasing agent, the above-mentioned cellulose derivative may be subjected in advance to silane coupling treatment or silicone treatment. A solventless type silicone based releasing agent is preferably combined with a cellulose derivative which has been subjected in advance to such a treatment. Moreover, it is preferable to select ethyl cellulose, methyl cellulose or carboxy cellulose from the viewpoints of performance and cost.

The proportion of the silicone based releasing agent to the cellulose derivative that are used in the present invention is different depending upon the type of the ceramic slurry to be used, but the solid content ratio by weight (silicone based releasing agent:cellulose derivative) is preferably 90:10 to 3:97, particularly preferably 87:13 to 40:60.

The ratio of the silicone based releasing agent to be used therein, when being more than the foregoing range, brings about a decrease in wettability accompanying a decrease in critical surface tension of the releasing layer surface, thus causing repelling, whereby favorable coating is made impossible to form. On the other hand, the ratio of the cellulose derivative to be used therein, when being less than the foregoing range, gives rise to insufficiency in releasing performance, thus making it difficult to peel off the green sheet from the casting film in the foregoing Step ③.

In the case where the releasing agent is used for producing a green sheet in which use is made of ceramic slurry of the type being difficult to pee l off from the casting film, it is suitable to increase the ratio of the silicone resin within the above-mentioned range, whereas the releasing agent is used for producing a green sheet in which use is made of ceramic slurry of the type being easy to peel off from the casting film, it is suitable to increase the ratio of the cellulose derivative within aforesaid range.

The substrate film to be used in the present invention is not specifically limited, but may be properly optionally selected for use from any of the well known films which have heretofore been usable as a substrate film for a casting film for producing a ceramic green sheet. Examples of such films include a polyester film made of polyethylene terephthalate, polyethylene naphthalate or the like, a polyolefin film made of polypropylene, polymethylpentene or the like, a polycarbonate film and polyvinyl acetate film. Of these, a polyester film is preferable and a biaxially oriented polyethylene terephthalate film is preferable in particular from the aspects of smoothness, heat resistance and cost. There is usually used a substrate film having a thickness in the range of 12 to 125 μm.

In order to obtain the casting film in accordance with the present invention, a coating solution is prepared at first which contains the aforesaid silicone based releasing agent and the cellulose derivative at a prescribed ratio. In the preparation, a coating solution having a viscosity which enables coating is prepared by using as a diluent, any of toluene, hexane, ethyl acetate, methyl ethyl ketone, heptane and a mixture thereof in a system of solvent type silicone based releasing agent/cellulose derivative, or by generally using water as a diluent in a system of emulsion type silicone based releasing agent/cellulose derivative. The coating solution may be incorporated at need, with a filler, antistatic agent, dye, pigment, other additive, etc.

The coating solution thus prepared is applied to either or both sides of the aforesaid substrate film by means of, for instance, gravure coat method, bar coat method, spray coat method, spin coat method, multi-roll coat method or the like.

The coating amount expressed in terms of solid content is in the range of suitably 0.01 to 1.0 g/m$^2$, preferably 0.03 to 0.5 g/m$^2$ in particular. The coating amount, when being less than 0.01 g/m$^2$, brings about poor releasability, whereas the coating amount, when being more than 1.0 g/m², gives rise to possibility of causing repelling at a time of ceramic slurry coating. When the amount of the cellulose derivative to be used is increased to suppress the repelling, desirable releasability sometimes fails to be assured.

In order to cure the coating solution thus applied thereto, there may be used any of a heating treatment with an oven of a coating machine and the combination of a heating treatment with subsequent ultraviolet ray radiation. Of these, the latter is preferable from the viewpoints of thermal shrinkage or wrinkle to be prevented, curability of silicone resin and adhesiveness of the releasing agent to the substrate film.

In the case of heating treatment alone, the conditions thereof is not specifically limited provided that a period of time for sufficient curing is assured at a temperature in the range of 70 to 160° C., and it is usually suitable to carry out the heating treatment for 5 to 120 seconds thereat.

In the case of combination of heating treatment/ultraviolet ray radiation, the coated substrate film is firstly heat-treated at a temperature in the range of 40 to 120° C. to preliminarily cure the coating solution. The heating temperature, when being lower than 40° C., causes a fear of insufficiency in drying or preliminary curing, whereas the heating temperature, when being higher than 120° C., causes thermal shrinkage or wrinkle, thereby sometimes failing to attain the objects of the the present invention. Taking into consideration the drying, preliminary curing, thermal shrinkage or wrinkle and the like factors, the heating temperature is preferably in the range of 50 to 100° C. The heating time can be shortened as compared with the case of the heating treatment alone.

In the present invention, the coating solution layer which has been preliminarily cured by the heat treatment is subjected to inline ultraviolet ray radiation to completely cure the layer. Usable ultraviolet lamps are available from previously well known lamps such as high pressure mercury vapor lamp, metal halide lamp, high power metal halide lamp, non-electrode ultraviolet lamp. Of these, non-electrode ultraviolet lamp is preferable from the viewpoints of less thermal damage to the substrate film and favorable curability of the silicone resin due to suitable ultraviolet emission efficiency, amount of infrared ray irradiation, etc. The foregoing lamp is available from D bulb, H bulb, H+bulb, V bulb and the like manufactured by Fusion Corporation, of which H bulb and H+bulb are particularly preferable. The ultraviolet irradiation output is in the range of usually 30 W/cm to 600 W/cm, preferably 50 W/cm to 360 W/cm.

In order to further enhance the adhesiveness between the substrate film and the releasing layer, the substrate film may in advance, be subjected to a adhesiveness enhancing treatment such as corona discharge treatment, ozone treatment, flame treatment, anchor coat agent coating and the like.

Moreover, the releasing agent may be applied to the entire surface of the substrate film or to part of the surface thereof, for instance, pattern coating in which a non-coating portion is placed at both the ends so as to regulate the releasability and adhesiveness.

The casting film thus obtainable according to the present invention is used for producing ceramic green sheets, and is well suited for producing ceramic green sheets which has a thickness of preferably 20 μm or less, more preferably 10 μm or less, particularly preferably 4 μm or less.

In addition, the casting film according to the present invention is characterized by favorable adhesiveness among the sheets in the case where ceramic green sheets are laminated in multi-layer because of less migration of the silicone based releasing agent to the ceramic slurry.

Furthermore, the ceramic slurry for electronic part items which is used for the production of ceramic green sheet is broadly classified into solvent system and aqueous system, to both of which is applicable the casting film according to the present invention.

In summarizing the working effect of the casting film according to the present invention, the casting film is imparted with excellent wettability of ceramic slurry and moderate releasability for ceramic green sheets and besides, prevents the occurrence of repelling even in the case of the ceramic slurry being applied in a small thickness, and also the occurrence of lifting or peeling off of the green sheets even in the case of repeatedly carrying out the steps of coating ceramic slurry and printing electrode.

In the following, the present invention will be described in more detail with reference to comparative examples and working examples, which however shall never limit the present invention thereto.

Evaluations were made of the various characteristics of each of the casting films that were obtained through the working examples and comparative examples according to the evaluation procedures as described hereunder.

(1) Wettability of Ceramic Slurry

A blend of 100 parts by weight of barium titanate powder, 5 parts by weight of an acrylic resin, 40 parts by weight of methylene chloride, 25 parts by weight of acetone and 6 parts by weight of mineral spirit was prepared, and mixed for 24 hours with a pot stand by the use of zirconia beads having a diameter of 10 mm to produce ceramic slurry having a high dielectric constant. The resultant ceramic slurry was applied to releasing surfaces of a casting film with a slot die coater so that the thickness of the coating after dryness was made to be 3 μm, followed by drying treatment to prepare a green sheet. During the procedure, the wettability (repelling, unevenness of coating being present or not) of the ceramic slurry was visually observed, and the result was evaluated in accordance with the following criterion.

◎: no repelling nor unevenness of coating observed showing excellent coating surface (not causing practical problem)
○: no repelling observed (not causing practical problem)
x: repelling observed (causing practical problem)

(2) Lift and Peeling Off of Green Sheet

The green sheet which had been prepared in the foregoing procedure (1) was subjected to repeated coating with the ceramic slurry according to the procedure (1). Thereafter, visual observation was made whether or not lift and/or peeling off were generated between the casting film and the green sheet which had been formed at first.

○: no lift nor peeling off observed (not causing practical problem)
x: lift and peeling off observed (causing practical problem)

(3) Releasability of Green Sheet

Evaluations were made of the releasability of the green sheets that were prepared in the foregoing procedure (2) by means of hand peeling test.

◎: smooth releasing without deformation of sheet (not causing practical problem)
○: released without deformation of sheet (not causing practical problem)
x: difficult to release due to marked deformation of sheet (causing practical problem)
x x: not releasable (causing practical problem)

EXAMPLE 1

To a solvent type addition reaction type silicone based releasing agent (solid content of 30% by weight, manufactured by Dow Corning Toray Silicone Co., Ltd. under the trade name "SRX-211") comprising as a principal ingredient, polydimethyl-siloxane having vinyl group as a functional group and a cross-linking agent (polymethylhydrogen siloxane) was added ethyl cellulose which had been diluted in advance to a concentration of 10% by weight with toluene, while regulating the solid content ratio by weight of the silicone based releasing agent/ethyl cellulose to 75:25. The resultant mixture was diluted with an organic solvent comprising toluene as a principal ingredient and then, was incorporated with a platinum base catalyst (solid content of 100% by weight, manufactured by Dow Corning Toray Silicone Co., Ltd. under the trade name "SRX-212") in an amount of 2 parts by weight based on 100 parts by weight of the silicone based releasing agent to prepare a coating solution having a solid content of 2% by weight.

The coating solution was uniformly applied through gravure coat method, to a biaxially oriented PET film having a thickness of 38 μm so as to form a coating amount expressed in terms of solid content being 0.1 g/m². Subsequently the coated PET film was heat-treated for 30 seconds in a hot air circulation type dryer at 110° C. to cure the coating solution and prepare a casting film. Various characteristics of the casting film thus obtained are given in Table 1.

EXAMPLE 2

The procedure in Example 1 was repeated to prepare a casting film except that acetophenone as a photosensitizer in an amount expressed in terms of solid content of 0.1 part by weight was added to 100 parts by weight of the silicone based releasing agent, the coated PET film was heat-treated for 20 seconds in a hot air circulation type dryer at 90, and immediately there-after was irradiated with ultraviolet ray by using a conveyor type ultraviolet irradiating machine equipped with a fusion H bulb of 240 W/cm and an irradiation distance of 102 mm at a conveyor speed of 100 meter per minute. Various characteristics of the casting film thus obtained are given in Table 1.

EXAMPLE 3

The procedure in Example 2 was repeated to prepare a casting film except that the solid content ratio by weight of the silicone based releasing agent/ethyl cellulose was set on 85:15 instead of 75:25. Various characteristics of the casting film thus obtained are given in Table 1.

EXAMPLE 4

The procedure in Example 2 was repeated to prepare a casting film except that the solid content ratio by weight of the silicone based releasing agent/ethyl cellulose was set on 25:75 instead of 75:25. Various characteristics of the casting film thus obtained are given in Table 1.

EXAMPLE 5

The procedure in Example 2 was repeated to prepare a casting film except that the solid content ratio by weight of the silicone based releasing agent/ethyl cellulose was set on 5:95 instead of 75:25. Various characteristics of the casting film thus obtained are given in Table 1.

EXAMPLE 6

Water was used to dilute an emulsion type addition reaction type silicone based releasing agent (solid content of 40% by weight, manufactured by Shin-Etsu Chemical Co., Ltd. under the trade name "X-52-195") comprising as a principal ingredient, polydimethylsiloxane having vinyl group as a functional group and a crosslinking agent (polymethylhydrogen siloxane). To the diluted releasing agent were added a platinum base catalyst (solid content of 20% by weight, manufactured by Shin-Etsu Chemical Co., Ltd. under the trade name "PM-10A") in an amount of 5 parts by weight based on 100 parts by weight of the silicone based releasing agent, and a solution of carboxymethyl cellulose in water, while regulating the solid content ratio by weight of the silicone based releasing agent/carboxymethyl cellulose to 80:20 to prepare a coating solution having a solid content of 6% by weight.

The coating solution was uniformly applied through gravure coat method, to a biaxially oriented PET film having a thickness of 38 μm so as to form a coating amount expressed in terms of solid content being 0.3 g/m². Subsequently the coated PET film was heat-treated for 30 seconds in a hot air circulation type dryer at 120° C. to cure the coating solution and prepare a casting film. Various characteristics of the casting film thus obtained are given in Table 1.

COMPARATIVE EXAMPLE 1

To a solvent type addition reaction type silicone based releasing agent (solid content of 30% by weight, manufactured by Dow Corning Toray Silicone Co., Ltd. under the trade name "SRX-211") was added a platinum base catalyst (manufactured by Dow Corning Toray Silicone Co., Ltd. under the trade name "SRX-212") in an amount of 2 parts by weight based on 100 parts by weight of the silicone based releasing agent. The resultant mixture was diluted with an organic solvent comprising toluene as a principal ingredient to prepare a coating solution having a solid content of 2% by weight.

The coating solution was uniformly applied through gravure coat method, to a biaxially oriented PET film having a thickness of 38 μm so as to form a coating amount expressed in terms of solid content being 0.1 g/m². Subsequently the coated PET film was heat-treated for 30 seconds in a hot air circulation type dryer at 110° C. to cure the coating solution and prepare a casting film. Various characteristics of the casting film thus obtained are given in Table 1.

TABLE 1

|  | Wettability of ceramic slurry | Lift/peeling off of green sheet (at the time of repeated coating of ceramic slurry) | Releasability of green sheet |
|---|---|---|---|
| Example 1 | ⊙ | ⊙ | ⊙ |
| Example 2 | ⊙ | ⊙ | ⊙ |
| Example 3 | ○ | ○ | ⊙ |
| Example 4 | ⊙ | ⊙ | ○ |
| Example 5 | ⊙ | ⊙ | ○ |
| Example 6 | ⊙ | ○ | ○ |
| Comp. Example 1 | x | x | ○ |

(Remarks) Comp. Example: Comparative Example

What is claimed is:

1. A method of producing a ceramic green sheet, comprising: applying a ceramic slurry to a releasing layer of a casting film; and drying the ceramic slurry thereby producing a ceramic green sheet; wherein said casting film comprises a substrate film and a releasing layer formed on at least one side of the substrate film, and the releasing layer comprises a mixture of a silicone releasing agent and a cellulose derivative.

2. A method of claim 1, wherein the silicone releasing agent is a silicone prepared by an addition reaction.

3. The method of claim 1, wherein the cellulose derivative is at least one cellulose compound selected from the group consisting of ethyl cellulose, methyl cellulose, hydroxyethyl cellulose, carboxymethyl cellulose, and hydroxypropyl cellulose.

4. The method of claim 1, wherein the release layer comprises a mixture of a silicone release agent and a cellulose derivative having a weight ratio of 90:10 to 3:97.

5. The method of claim 1, wherein the substrate film comprises polyethylene terephthalate.

6. The method of claim 1, wherein the silicone releasing agent is prepared by heat-curing a polyorganosiloxane having an alkenyl functional group.

7. The method of claim 1, wherein the silicone releasing agent is prepared by heating a polydimethylsiloxane having a vinyl and/or hexenyl functional group.

8. The method of claim 1, wherein the silicone releasing agent is crosslinked.

* * * * *